United States Patent
Kato et al.

(10) Patent No.: US 6,270,731 B1
(45) Date of Patent: Aug. 7, 2001

(54) CARBON DIOXIDE FIXATION SYSTEM

(75) Inventors: Saburo Kato; Hiroyuki Oshima; Masaaki Oota, all of Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 09/111,798

(22) Filed: Jul. 8, 1998

(30) Foreign Application Priority Data

Jul. 10, 1997 (JP) .................................................. 9-202423

(51) Int. Cl.$^7$ ................................ F01N 3/10; F01N 5/00
(52) U.S. Cl. .......................... 422/177; 422/169; 422/173; 422/150; 422/158
(58) Field of Search ..................... 422/168, 169, 422/170, 171, 150, 152, 153, 156, 158, 173, 177; 435/266; 423/459, 648.1, 650, 651

(56) References Cited

U.S. PATENT DOCUMENTS

| | | | |
|---|---|---|---|
| 3,796,545 | * 3/1974 | Liner | 23/259.5 |
| 3,861,885 | * 1/1975 | Schora | 44/545 |
| 3,962,411 | * 6/1976 | Setzer et al. | 423/651 |
| 5,401,480 | * 3/1995 | Johnson | 423/243.06 |
| 5,525,229 | * 6/1996 | Shih | 210/603 |
| 5,767,165 | 6/1998 | Steinberg et al. | 518/703 |

FOREIGN PATENT DOCUMENTS 1263 231  2/1972 (GB) .

OTHER PUBLICATIONS

Database WPI; Section Ch, Week 9930; Derwent Publications Ltd., London, GB; An 99–351055;XP002114544 & JP 11 128682 A (Shimadzu Corp), May 18, 1999.

Chemical Abstracts, vol. 119, No. 22, Nov. 29, 1993; Columbus, Ohio, US; abstract No. 229398, Uetake Naoto et al.: "Method and apparatus for converting carbon dioxide into carbon or methane"; XP002114644 & JP 05 193920 (Hitachi Ltd.) Aug. 3, 1993.

* cited by examiner

*Primary Examiner*—Marian C. Knode
*Assistant Examiner*—Frederick Varcoe
(74) *Attorney, Agent, or Firm*—Armstrong, Westerman, Hattori, McLeland & Naughton, LLP

(57) ABSTRACT

A $CO_2$ fixation system for fixing $Co_2$ gas existing in the atmosphere or in an exhaust gas emitted from factories and other burning sites. The system includes a fermenting tank for anaerobically fermenting organic wastes, whereby methane gas is produced. The methane gas is decomposed and hydrogen gas is produced. The hydrogen gas is reacted with the $CO_2$ gas to produce carbon powder and water, whereby the $CO_2$ gas is fixed to become harmless to the global warming.

4 Claims, 5 Drawing Sheets

CARBON DIOXIDE FIXATION SYSTEM

The present invention relates to a carbon dioxide fixation system for retrieving carbon dioxide gas existing in the atmosphere or contained in an exhaust gas emitted from factories or industrial plants.

BACKGROUND OF THE INVENTION

The global warming is known to be mainly caused by carbon dioxide gas which is emitted through human activities into the atmosphere from factories, industrial plants, thermal power plants, automobiles and so on. Reduction of carbon dioxide gas emission or retrieval of carbon dioxide gas existing in the atmosphere is thus recognized as one of the most important measures for protecting the environment.

Numerous systems have been proposed to reduce the emission or content of carbon dioxide gas. One of these such systems is shown in FIG. 5. The carbon dioxide fixation system of FIG. 5 is composed substantially of a $CO_2$ isolator 6, an $H_2$ producer 8 and a reactor 9. The $CO_2$ isolator 6 isolates $CO_2$ from the exhaust gas of a $CO_2$ source 1, which is typically an industrial plant or a thermal plant, and concentrates the $CO_2$ gas by eliminating impurities therefrom. The $H_2$ producer 8 produces $H_2$ gas by a known method such as electrolytic water decomposition. In the reactor 9, the $CO_2$ gas and $H_2$ gas react so that $CO_2$-fixing products such as methanol ($CH_3OH$), for example, are produced. Thus the $CO_2$ gas retrieved from the atmosphere is fixed to a state harmless to the global warming, and, further, is changed to methanol which can be used as a fuel.

The above conventional $CO_2$ fixation system has a serious drawback, that is, a large amount of electric energy is required to produce hydrogen gas by the electrolytic process. It is estimated that more than 90 percent of the total operational energy of the conventional $CO_2$ fixation system is consumed in the hydrogen producer 8. Except in the case where the price of electricity is very low, the running cost of such $CO_2$ fixation system is normally very high. The system has another disadvantage in that it does not reduce the $CO_2$ emission so much as a whole. In some countries, a large part of electricity is generated thermally. In a thermal power plant, fossil fuel such as oil, coal or natural gas is burned to generate high temperature steam, through which a large amount of $CO_2$ gas is inevitably generated.

Thus the following system is proposed. A part of the $CO_2$ fixation system including the hydrogen producer is installed in a place (or country) where there is a stable supply of electricity at low cost and where it is generated by a method other than burning fossil fuel, such as by a hydraulic generator or by solar batteries. $CO_2$ gas retrieved from the atmosphere and liquefied in other areas is transported by tankers or other carriers to the place, where the liquefied $CO_2$ is reacted with hydrogen to produce methanol. The methanol is then usually transported back to the areas of the $CO_2$ source.

The above separating system is difficult to visualize practically because the $CO_2$ is not processed near its emission source but the liquefied $CO_2$, and its fixed product, must be transported to a remote place, which increases the processing cost.

SUMMARY OF THE INVENTION

An object of the present invention is therefore to provide an energy efficient, low cost $CO_2$ fixation system having a high overall $CO_2$ reducing performance.

The system according to the present invention is a system for fixing $CO_2$ gas in an atmosphere or in an exhaust gas, which includes:

fermentor for anaerobically fermenting organic wastes and for isolating methane gas;

hydrogen producing reactor for decomposing the methane gas produced by the fermentor and for producing hydrogen gas; and fixing reactor for allowing a reaction between the hydrogen gas produced in the hydrogen producing reactor and the $CO_2$ gas in the atmosphere or in the exhaust gas and for producing solid state carbon and water.

In the inventive $CO_2$ fixation system described above, the hydrogen gas necessary to fix $CO_2$ gas is produced not by electrolytical means but by decomposing methane which is obtained through an anaerobic fermentation of organic wastes. Thus the electric power needed by the system is greatly decreased, so that the system can be installed close to the sites of $CO_2$ source even though the electric cost is high in such areas.

Since the electric power consumed by the system is greatly reduced, the overall efficiency of $CO_2$ reduction is considerably improved. It also reduces other harmful substances inherently emitted from thermal plants when fossil fuels are burned in generating electricity.

The $CO_2$ fixation system may further include a first heat exchanger in which heat is retrieved from the exhaust gas. The retrieved heat can be given to the fermentor for enhancing the fermenting reaction.

The $CO_2$ fixation system may further include a second heat exchanger in which heat is retrieved from the hydrogen producing reactor. The heat retrieved here can also be given to the fermentor.

The heat obtained in the first or second heat exchanger may also be used to generate electricity, where the electricity can be used to operate the system.

DETAILED DESCRIPTION OF PREFERRED EMBODIMENTS

Figure 1:
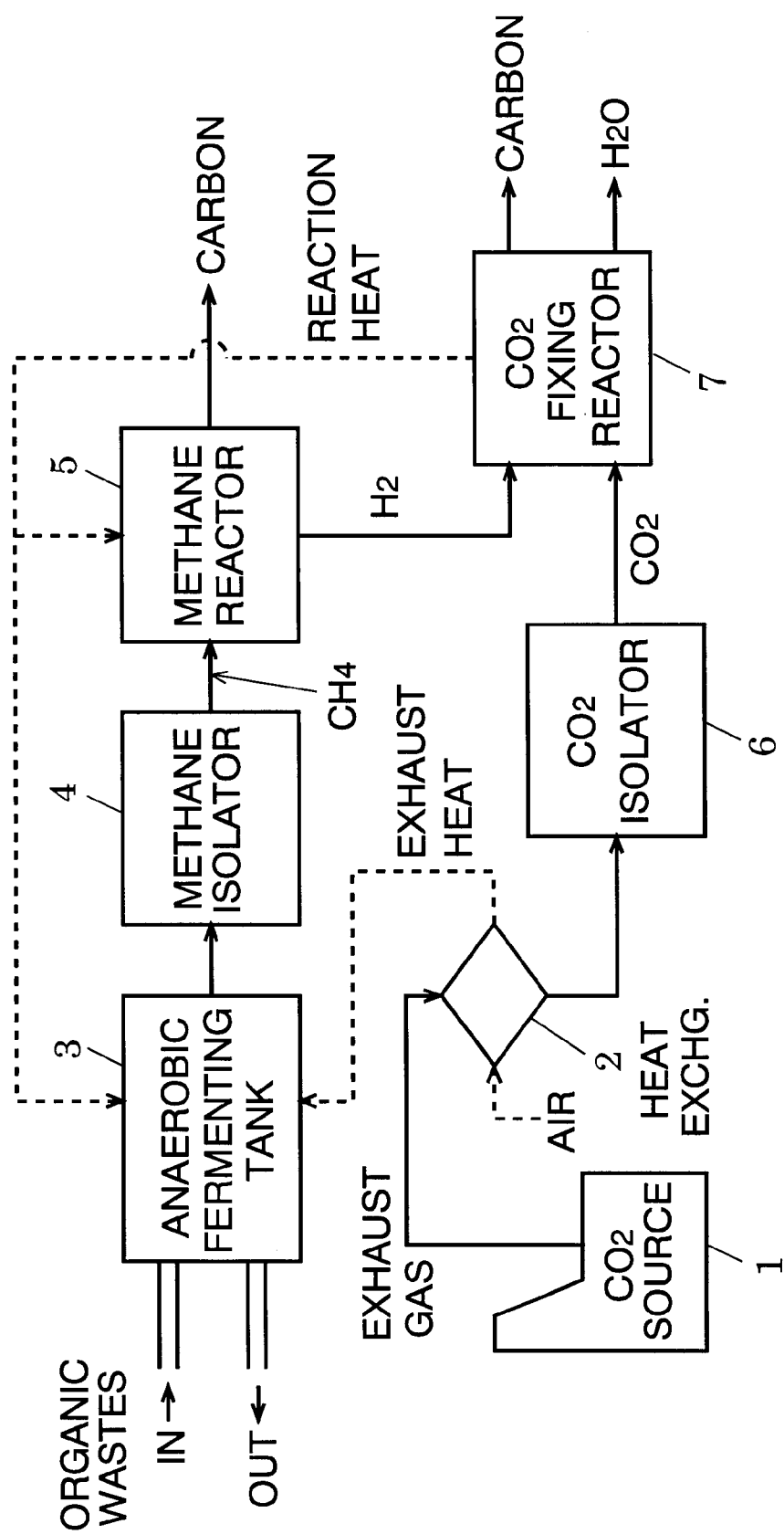
FIG. 1 is a block diagram of a $CO_2$ fixation system embodying the present invention.

A first $CO_2$ fixation system embodying the present invention is described referring to FIG. 1. The $CO_2$ fixation system includes a heat exchanger 2, an anaerobic fermenting tank 3, a methane isolator 4, a methane reactor 5, a $CO_2$ isolator 6, and a $CO_2$ fixing reactor 7.

Gas exhausted from a $CO_2$ source 1, such as a thermal power plant or an industrial plant, flows through the heat exchanger 2.

Since such exhaust gas is produced by burning fossil fuels, its temperature is normally very high: about 350° C. for example. In the heat exchanger 2, the heat of the exhaust gas is given to air which is flowing through another path of the heat exchanger 2, whereby a large amount of heat is retrieved from the exhaust gas. After the heat exchange, the exhaust gas, whose temperature is now as low as about 50° C, is introduced to the $CO_2$ isolator 6, and the heated air is sent to the anaerobic fermenting tank 3.

Organic wastes are mostly retrieved from sewage. Such organic wastes, or those from other sources, are thrown into the anaerobic fermenting tank 3 from time to time, and anaerobic bacteria such as methane bacteria are added thereon, whereby the organic wastes are fermented. When fermentation is carried out with no oxygen present, $CO_2$ gas is scarcely generated but a large amount of methane gas and hydrogen sulfide gas are produced. Such an anaerobic fermentation is most effectively carried out under the temperature condition of about 60° C. That is why the heat retrieved from the exhaust gas in the heat exchanger 2 or the reaction heat of $CO_2$ fixing reactor 7, which will be described later, is utilized to maintain the anaerobic fermenting tank 3 at such temperature.

The gas produced in the anaerobic fermenting tank 3 containing methane is delivered to the methane isolator 4, where methane gas is exclusively extracted and concentrated. Various known methods can be used for such extraction and concentration: such as using an osmotic membrane which selectively allows gas molecules to permeate the membrane, and an adsorbent which selectively adsorbs gas molecules, and so on.

The concentrated methane gas is delivered to the methane reactor 5, where the methane is decomposed under a high temperature condition using metallic catalyst, such as nickel, for example, as follows:

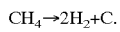
$$CH_4 \rightarrow 2H_2 + C.$$

The $H_2$ gas produced here is delivered to the $CO_2$ fixing reactor 7, and the other product, carbon, is obtained in a solid state, i.e., as powder.

In the $CO_2$ isolator 6, meanwhile, $CO_2$ gas is exclusively extracted and concentrated as in the methane isolator 4 described above. In the $CO_2$ fixing reactor 7, the $H_2$ gas from the methane reactor 5 and the $CO_2$ gas from the $CO_2$ isolator 6 meet, and the following reaction takes place under the presence of catalyst.

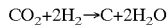
$$CO_2 + 2H_2 \rightarrow C + 2H_2O$$

To initiate the above reaction, the temperature should be set at more than several hundreds ° C., but, once it is initiated, the reaction continues without heating because the reaction gives off heat. Rather, excess heat can be obtained from the reaction. The heat obtained from the reaction can be supplied to the methane reactor 5 or to the anaerobic fermenting tank 3 both of which require heat for continuous operation as described above. The water produced in the $CO_2$ fixing reactor 7 is drained, and the carbon is obtained as a fine powder.

Thus pure carbon is continuously produced by introducing exhaust gas into the system from the $CO_2$ source 1. The carbon product can be used as an industrial carbon black.

Figure 3:
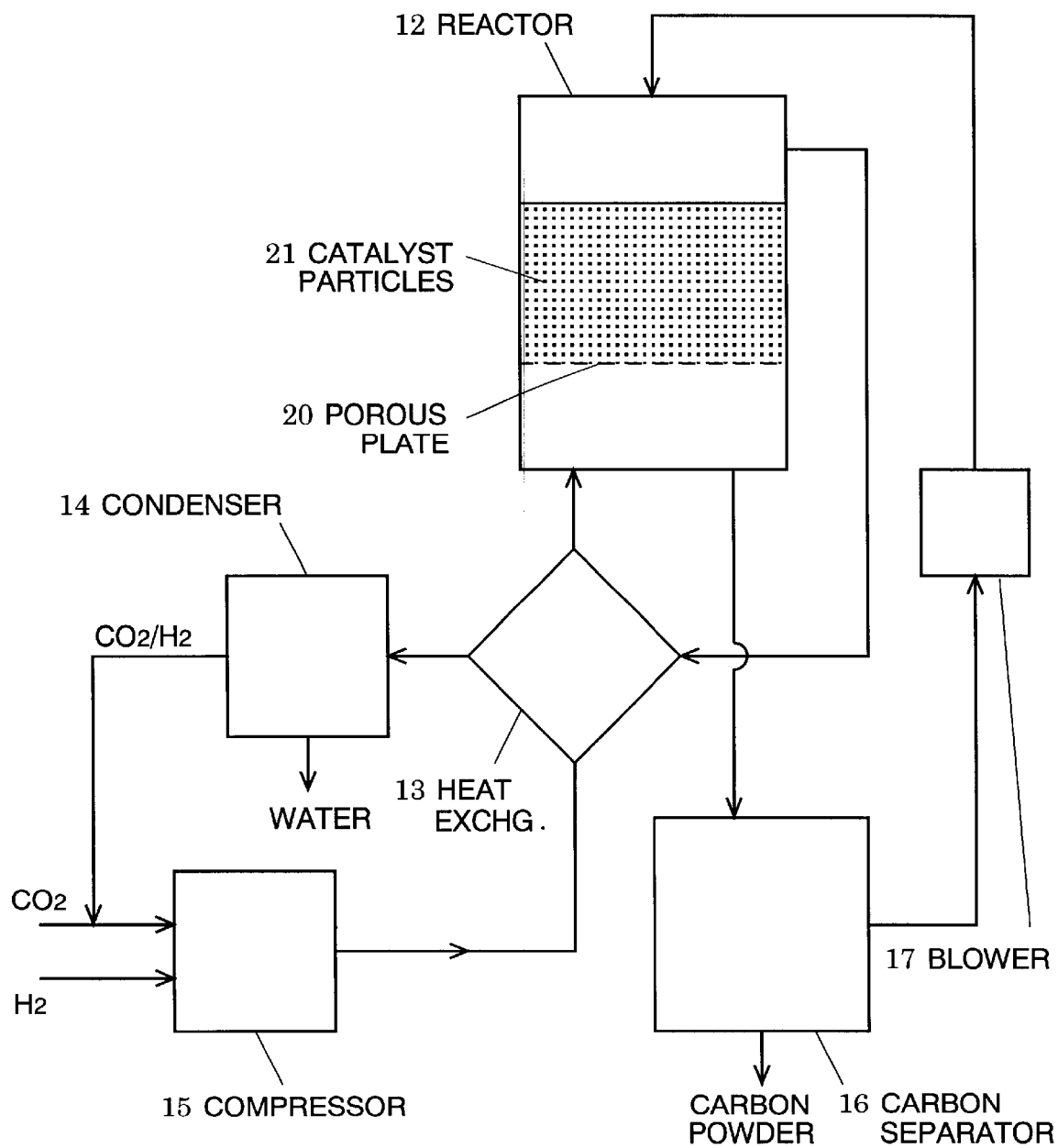
FIG. 3 is a block diagram of a system added to a $CO_2$ fixing reactor for preventing degeneration of its catalyst.

The fine carbon powder produced in the reaction tends to cover the surfaces of the catalyst (which is usually in particles) and decrease its catalyzing efficiency. Since this may also lower the efficiency of the whole $CO_2$ fixation system, the following additional system is preferred to be included in the $CO_2$ fixing reactor 7. FIG. 3 shows one of such systems. The $CO_2$ gas from the $CO_2$ isolator 6 and the $H_2$ gas from the methane reactor 5 are mixed and compressed in a compressor 15, and the mixture is sent to a reactor 12. Before entering the reactor 12, the mixed gas is heated by a heat exchanger 13, which will be described later. In the reactor 12, catalyst particles 21 are contained and placed on a porous plate 20. When the mixed gas is supplied by the compressor 15 into the reactor 12 from under the porous plate 20, the catalyst particles 21 are blown and form a fluidized bed, in which the $CO_2$ gas and the $H_2$ gas react as described above. The water vapor product from the reaction, as well as unreacted $CO_2$ gas and $H_2$ gas, is exhausted from the upper part of the reactor 12 and enters a condenser 14 where it is condensed to liquid water and drained. Since the temperature of the water vapor is very high due to the reaction heat, its heat is utilized to heat the $CO_2/H_2$ mixture at the heat exchanger 13. After water is eliminated, the exhaust gas from the reactor 12 containing unreacted $CO_2$ gas and $H_2$ gas is again supplied to the reactor 12 by the compressor 15.

The fine carbon powder product from the reaction in the reactor 12 attaches to the surfaces of the catalyst particles 21. With a proper operation of the compressor 15, the flow of the $CO_2/H_2$ mixture into the reactor 12 is controlled so that a part of the catalyst particles 21 falls in the reactor 12 and sent to a carbon separator 16. In the carbon separator 16, carbon powder is separated from the catalyst particles 21 by centrifugation or by filtering, and the catalyst particles 21 are returned to the reactor 12 by a blower 17, while the reaction takes place in the reactor 12.

Figure 4:
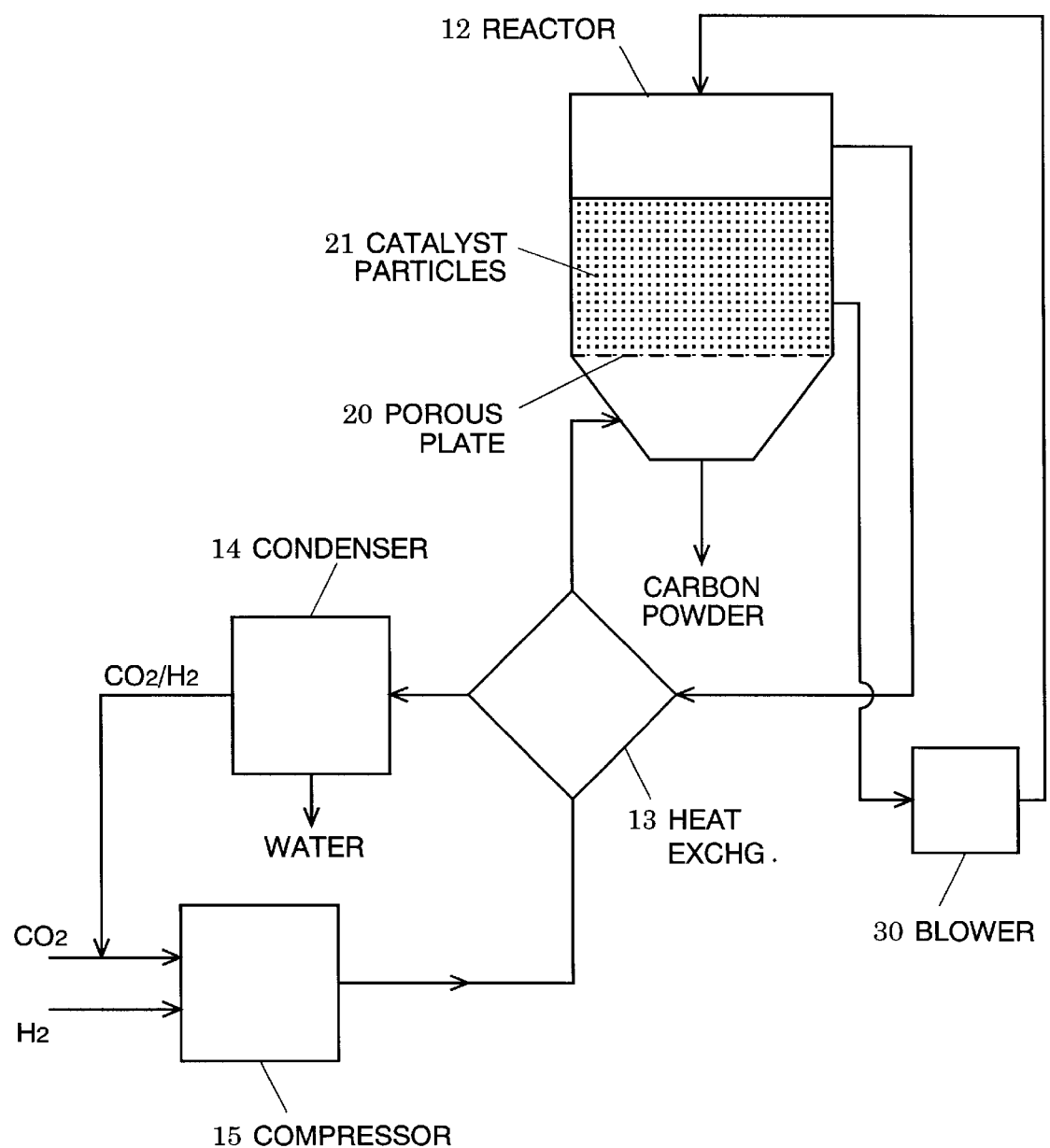
FIG. 4 is a block diagram of another such system.
Figure 5:
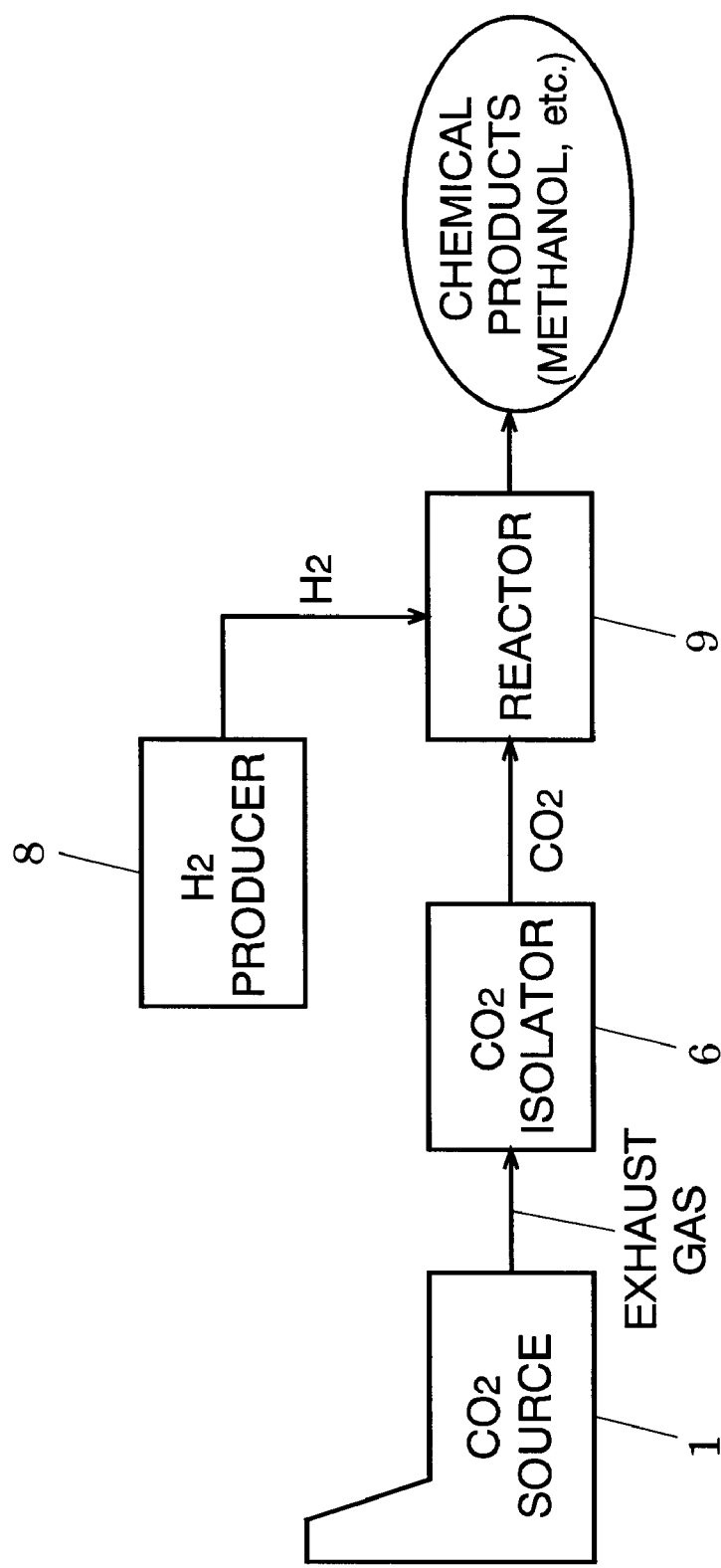
FIG. 5 is a block diagram of a conventional $CO_2$ fixation system.

Another example of such systems is shown in FIG. 4. In this system, the carbon separator 16 of the previous system is not used, but a blower 30 connects the lower part of the fluidized bed of the catalyst particles 21 and the top of the reactor 12. The circulating flow of the catalyst particles 21 and the gas made by the blower 30 agitate the fluidized bed in the reactor 12 whereby the carbon powder attached to the surfaces of the catalyst particles 21 is removed by the centrifugal force and taken out of the reactor 12 from its bottom.

Obviously, many modifications and variations of the present invention are possible in the light of the above teachings. It is therefore to be understood that within the scope of the appended claims, the invention may be practiced other than as specifically described. The following is an example of such modifications.

Figure 2:
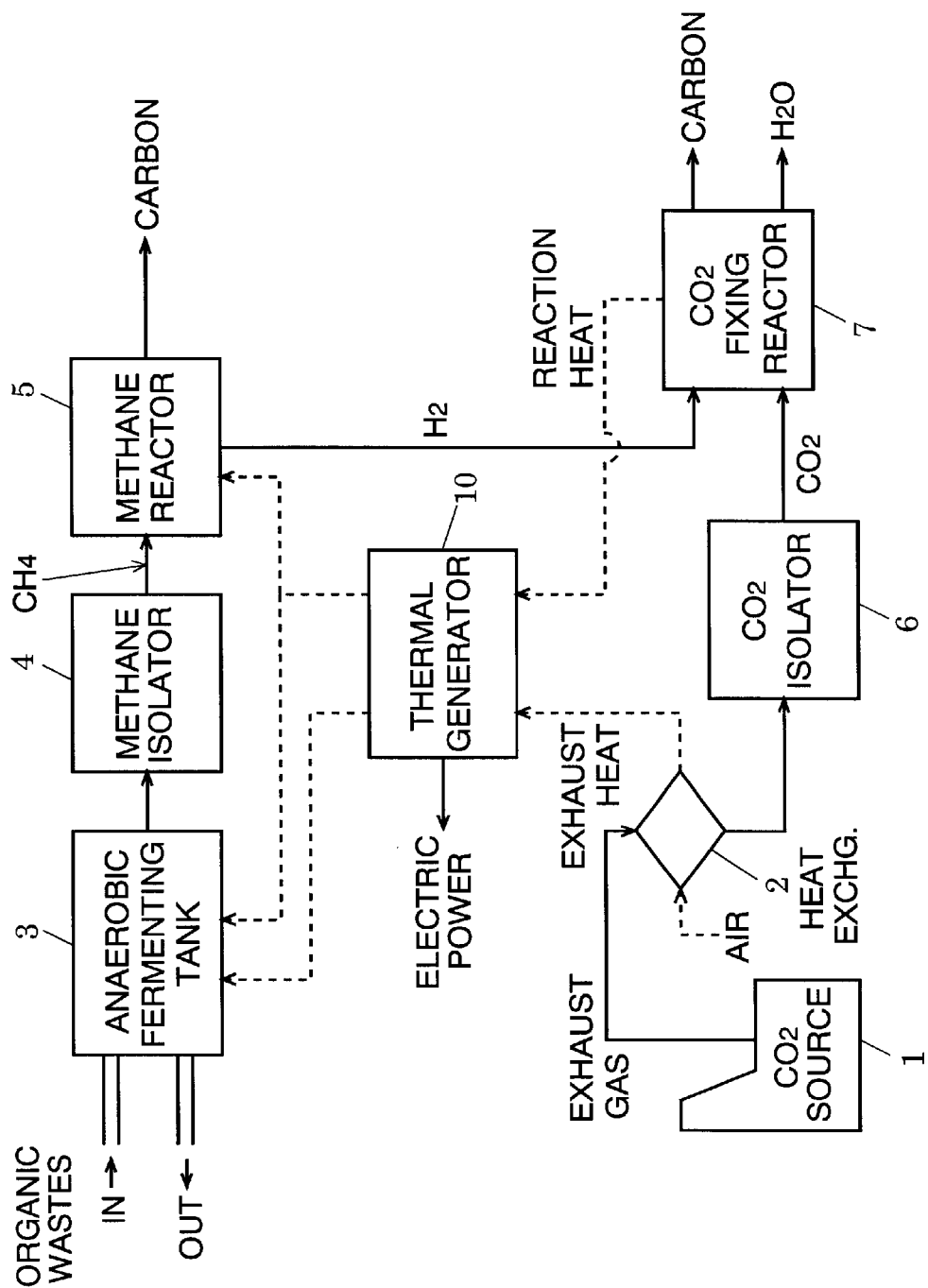
FIG. 2 is a block diagram of another $CO_2$ fixation system embodying the present invention.

Since the system includes gas flow pumps and other operational machines, it consumes electric power which should be supplied externally. A part of the electric power needed by the system can be produced in the system itself and the externally supplied electric power can be reduced by utilizing the reaction heat retrieved in the heat exchanger 2 or obtained in the $CO_2$ fixing reactor 7. The diagram of FIG. 2 shows an example of such a system in which a thermal generator 10 is included in the system for producing electricity using the high temperature steam produced in the heat exchanger 2 or obtained in the $CO_2$ fixing reactor 7.

What is claimed is:

1. A carbon dioxide ($CO_2$) fixation system for fixing carbon dioxide gas in an atmosphere or in an exhaust gas, the system comprising:

fermenting means for anaerobically fermenting organic wastes and for producing methane gas;

hydrogen producing means for decomposing the methane gas produced by the fermenting means and for producing hydrogen gas;

fixing means for allowing a reaction between the hydrogen gas produced by the hydrogen producing means and the $CO_2$ gas from the atmosphere or from the exhaust gas and for producing carbon and water; and a first heat exchanger, in communication with a supply means for the exhaust gas and the fermenting means, for retrieving heat from the exhaust gas to supply the fermenting means.

2. The $CO_2$ fixation system according to claim 1, wherein the system further comprises a second heat exchanger in communication with the fixing means and the fermenting means, for retrieving heat from the fixing means to supply to the fermenting means.

3. The $CO_2$ fixation system according to claim 1, wherein the system further comprises an electric power generator, in communication with the first heat exchanger, for generating electricity using the retrieved heat.

4. The $CO_2$ fixation system according to claim 2, wherein the system further comprises an electric power generator, in communication with the second heat exchanger, for generating electricity using the retrieved heat.

* * * * *